United States Patent
Salzmann et al.

[11] Patent Number: 5,976,449
[45] Date of Patent: *Nov. 2, 1999

[54] METHOD AND APPARATUS FOR THE CROSS-SECTIONAL MEASUREMENT OF ELECTRIC INSULATED CONDUCTORS

[75] Inventors: Hannes Salzmann, Greppen; Ulrich Jung, Altdorf; Wilfried Kötter, Attinghausen, all of Switzerland

[73] Assignee: Zumbach Electronic AG, Orpund, Switzerland

[*] Notice: This patent is subject to a terminal disclaimer.

[21] Appl. No.: 08/987,163

[22] Filed: Dec. 8, 1997

Related U.S. Application Data

[63] Continuation of application No. 08/534,021, Sep. 26, 1995, Pat. No. 5,795,531, which is a continuation-in-part of application No. 08/260,166, Jun. 15, 1994, Pat. No. 5,518,681, which is a continuation of application No. 07/865,398, Apr. 8, 1992, abandoned.

[30] Foreign Application Priority Data

Apr. 9, 1991 [CH] Switzerland .............................. 1053/91

[51] Int. Cl.$^6$ .............................. B29C 47/06; B29C 47/92
[52] U.S. Cl. .......................... 264/408; 264/473; 264/488; 264/171.15; 264/171.17; 378/54; 425/114; 425/141

[58] Field of Search .................................... 264/408, 473, 264/488, 171.15, 171.17, 173.12, 174.11; 425/113, 114, 140, 141; 378/54, 58

[56] References Cited

U.S. PATENT DOCUMENTS 3,609,368 9/1971 Knorr .
5,138,644 8/1992 McArdle .
5,518,681 5/1996 Salzmann et al. .

*Primary Examiner*—Mathieu D. Vargot
*Attorney, Agent, or Firm*—Venable; George H. Spencer; Catherine M. Voorhees

[57] ABSTRACT

A method and an apparatus for measuring an electric insulated conductor, in particular a medium-voltage and/or high-voltage insulated conductor, are proposed. Seen in profile cross-section, the insulated conductor (50) includes a copper conductor, an inner semiconductor, an insulation and an outer semiconductor and is produced in an extrusion device (90) having an appropriately assigned crosslinking section (40). To achieve an even distribution of the two semiconductor layers and of the insulation layer, the insulated conductor (50) is radiated through immediately at the outlet from the crosslinking section (40) and a correction of the die setting in the extrusion device is carried out by means of values thus determined.

3 Claims, 2 Drawing Sheets

METHOD AND APPARATUS FOR THE CROSS-SECTIONAL MEASUREMENT OF ELECTRIC INSULATED CONDUCTORS

CROSS-REFERENCE TO THE RELATED APPLICATIONS

This application is a continuation of application Ser. No. 08/534,021 filed Sep. 26, 1995, now U.S. Pat. No. 5,795,531, issued Aug. 18, 1998 which is a continuation-in-part of application Ser. No. 08/260,166 filed Jun. 15, 1994, now U.S. Pat. No. 5,518,681 issued May 21, 1996, which is a continuation of application Ser. No. 07/865,398 filed Apr. 8, 1992, now abandoned.

BACKGROUND OF THE INVENTION

The invention relates to a method of measuring the cross-section of an electric insulated conductor, in particular a medium-voltage and/or high-voltage insulated conductor, as well as to an apparatus for carrying out the method, in which method/apparatus an inner semiconductor, an insulation and an outer semiconductor are applied to a copper conductor in an extrusion device provided with appropriate dies, and the individual layers of the insulated conductor are crosslinked in an appropriate installation.

EP-A 0 400 310 discloses an apparatus for controlling the outside diameter of an insulated conductor, in which apparatus the outside diameter of the plastics strand emerging from the extruder is measured by means of a first measuring device immediately following the extruder and by a second measuring device following a cooling section and the actual diameter determined by this way of measuring is compared with the set diameter. A signal is formed from the difference values and this signal is used for controlling the speed of the extruder or for controlling the take-off rate of the plastics strand emerging from the extruder. With the known apparatus, only the outer diameter is measured and, in the event of any deviations, the extruder corrected correspondingly.

EP-A 0 387 508 discloses an apparatus for vulcanising or crosslinking an insulated conductor strand, which apparatus essentially comprises a tubular body which is designed with an inspection-glass fitting and essentially forms the heating and cooling zone.

With current requirements for such insulated conductors, but in particular in the case of medium-voltage and high-voltage insulated conductors having a plurality of plastic layers surrounding a copper conductor, it is necessary that, on the one hand, the copper conductor is arranged centrally in the insulated conductor and, on the other hand, the individual plastic layers have minimum possible difference in thickness over the circumference of the insulated conductor, i.e. that the individual layers are evenly distributed on the finished insulated conductor.

SUMMARY OF THE INVENTION

The invention is therefore based on the object of providing a method and an apparatus for carrying out the method by which an exact measurement of the thickness of the plastic layer and determination of the centricity of the copper conductor can be carried out.

This object is achieved by the method according to the invention in that the individual semiconductor and insulation layers of the insulated conductor emerging from the extrusion device are radiated through in at least two directions oriented orthogonally to the insulated conductor axis to determine absorption values and the values thus determined are used for correction of the individual layer thicknesses of the two semiconductors and of the insulation.

By the method according to the invention, in addition to the absorption values determined, undesired impurities or inhomogeneities of the layers passed through by the beams can also be detected, so that at the same time optimal quality assurance can also be achieved thereby.

The apparatus for carrying out the method comprises an extrusion device and an assigned crosslinking device, the extrusion device comprising at least one extruder head, which is provided with settable dies and by means of which an insulated conductor which comprises at least one copper conductor, an inner semiconductor, an insulation and an outer semiconductor and is thermally crosslinked in the crosslinking device is produced, and is characterised in that a measuring device passing a radiation through the individual layer thicknesses of the two semiconductors and of the insulation is arranged immediately downstream, in the through-running direction, of the extruder head applying the outer semiconductor.

BRIEF DESCRIPTION OF THE DRAWING

Further features of the invention emerge from the following description in conjunction with the drawing and the further patent claims.

The invention is described below with reference to the drawing, in which.

DETAILED DESCRIPTION OF THE INVENTION

Figure 1:
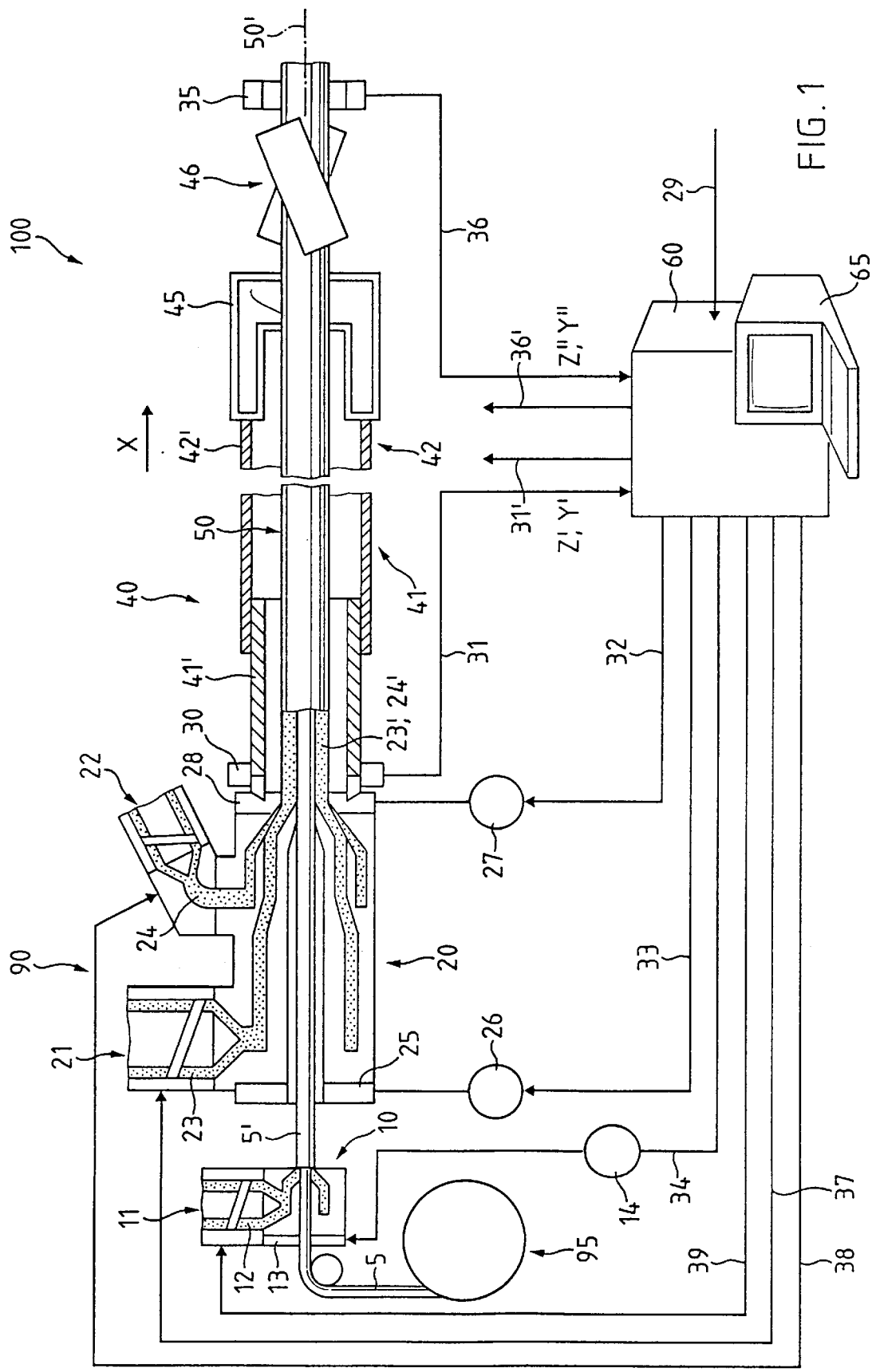
FIG. 1 shows a part, represented as a block diagram, of an installation for producing medium-voltage and/or high-voltage insulated conductors.

FIG. 1 shows a diagrammatically represented installation 100 for producing insulated conductors, in particular for producing medium-voltage and/or high-voltage insulated conductors. Such installations are known per se as so-called continuous vulcanisation installations (CV installation).

The installation 100, represented as an exemplary embodiment, essentially comprises an unwinding station 95, a single extruder head 10 and a double extruder head 20, a so-called crosslinking section 40 with appropriately assigned tube-end sealing device 45, a twisting caterpillar 46 and a winding station (not shown). The extruder heads 10, 20 together form an extrusion device 90, it being possible however, for the two extruder heads 10 and 20 to be designed as one unit, i.e. as a triple or multiple extruder head.

In the installation 100, a copper conductor 5 is drawn off from the unwinding station 95 by means of appropriately arranged and designed deflecting stations (not shown) and fed to the first extruder head 10 by means which are not shown.

The diagrammatically represented first extruder head 10 comprises a first extruder, denoted by 11, which is in effective connection with an appropriately assigned centering device 13 and is designed for applying inner semiconductor granules 12 to the copper conductor 5. When it leaves the first extruder head 10, the copper conductor 5', provided with the inner semiconductor 2 (FIG. 3), is fed to the double extruder head 20.

The double extruder head 20 comprises a second extruder 21, which is in effective connection with an appropriately assigned centering device 25 and is designed for applying insulation granules 23 to the copper conductor 5' provided with the inner semiconductor 2.

Subsequently or at the same time, appropriate outer semiconductor granules 24 are applied to the copper conductor 5', provided with the insulation granules 23, by an appropriately assigned third extruder 22 of the double extruder head 20. The third extruder 22 is effectively connected to an appropriately assigned centering device 28.

For setting and controlling the centring to be performed for applying the corresponding granules, the centering device 13 of the first extruder head 10 is in effective connection with a servomotor 14 and the centering device 25 of the double extruder head 20 is in effective connection with a servomotor 26 and the centering device 28 is in effective connection with a servomotor 27.

The insulated conductor 50, provided with the individual layers and emerging from the double extruder head 20 of the extrusion device 90 is in this case measured by means of an appropriately arranged first measuring device 30 with respect to the individual layer thicknesses and is subsequently passed through the crosslinking section, denoted overall by 40.

Figure 2:
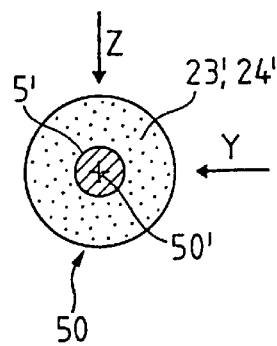
FIG. 2 shows an insulated conductor, represented diagrammatically and in profile cross-section, to explain the X-ray beams directed at it.

In FIG. 1 and FIG. 2, the insulation and semiconductor granules applied to the copper conductor 5' upstream of the crosslinking section 40 are denoted by 23' and 24'.

The crosslinking section 40, known per se and diagrammatically represented, essentially comprises a first tubular body 41' and a second tubular body 42', seen in the production and running-through direction X. Arranged on the tubular body 42' on the side opposite the extruder device 20 is the tube-end sealing device 45.

The two tubular bodies 41', 42' are telescopically connected to each other, there essentially being arranged in the tubular body 42' a heating section, denoted overall by 41, and a cooling section, denoted overall by 42. A thermally activated crosslinkage, i.e. a chemical bonding of the molecular chains of the insulation material and also of the semiconductor materials, takes place in the heating section 41 at about the order of 200° C. The insulated conductor 50 is appropriately cooled in the cooling section 42.

For technical production reasons, pressurised nitrogen or steam is introduced into the tubular bodies 41', 42', sealed off at both ends, the pressure prevailing in the tubular bodies 41', 42' preferably being of the order of 10 to 15 bar.

By means of the appropriately assigned twisting caterpillar 46, for technical production reasons the insulated conductor 50 is twisted in a way known per se essentially over the entire length of the crosslinking section 40.

The insulated conductor 50 emerging from the crosslinking section subsequently runs through a second measuring device 35, by means of which any eccentricity of the insulated conductor 50 is determined.

The measuring device 30, diagrammatically represented in FIG. 1, is essentially based on the X-ray technique known per se and is preferably adjustable and fixable with respect to the insulated conductor 50 in the circumferential direction of the insulated conductor 50 by means of which are not shown.

The measuring device 30 is designed in such a way that at least one X-ray beam, preferably a focused X-ray beam, is directed orthogonally to the insulated conductor axis 50' and the actual measuring device 30 can also be displaced parallel to the insulated conductor axis 50', as a result of which optimal radiation through the individual layers is achieved.

In the case of a preferred design, a first focused X-ray beam is directed from a transmitting device (not shown) of the measuring device 30 as shown in FIG. 2 in the direction of arrow Z, for example orthogonally to the insulated conductor axis 50', and a second X-ray beam, oriented at right angles thereto, is directed in the direction of arrow Y to the insulated conductor axis 50' and are in each case sensed by an appropriately assigned receiver device (not shown).

In order that the entire cross-section of the insulated conductor can be sensed, the measuring device 30 comprising the transmitter and receiver is displaced parallel to the insulated conductor axis 50'. The measurement in the direction of arrow Z and at right angles thereto in the direction of arrow Y can be carried out at any points in the circumferential direction of the insulated conductor 50.

Values Z' and Y', referred to the correspondingly measured wall thicknesses of the individual layers, are fed from the measuring device 30 via a line 31 to a computer 60 and are processed to form corresponding signals. Values Z", Y", referred to the eccentricity of the layers, are fed from the second measuring device 35 via a line 36 to the computer 60 and processed to form corresponding signals and displayed, for example on a monitor 65. The one measuring device 30 is appropriately activated by the computer 60 via a line 31' and the other measuring device 35 is appropriately activated by the computer 60 via a line 36'.

By means of a suitable computer program, certain set-value signals are generated with regard to the wall thickness and eccentricity for correction of the dies provided in the extruder heads 10, 20 and are fed via a line 32 to the second servomotor 27, in effective connection with the centering device 28, and/or via a line 33 to the servomotor 26, in effective connection with the centering device 25, and/or via a line 34 to the servomotor 14, in effective connection with the centering device 13.

Appropriate data are fed via a line 29 to the computer 60 for setting the entire installation 100. For speed control, appropriate set-value signals are fed from the computer 60 via a line 39 to the extruder 11, via a line 37 to the extruder 21 and via a line 38 to the extruder 22.

Figure 3:
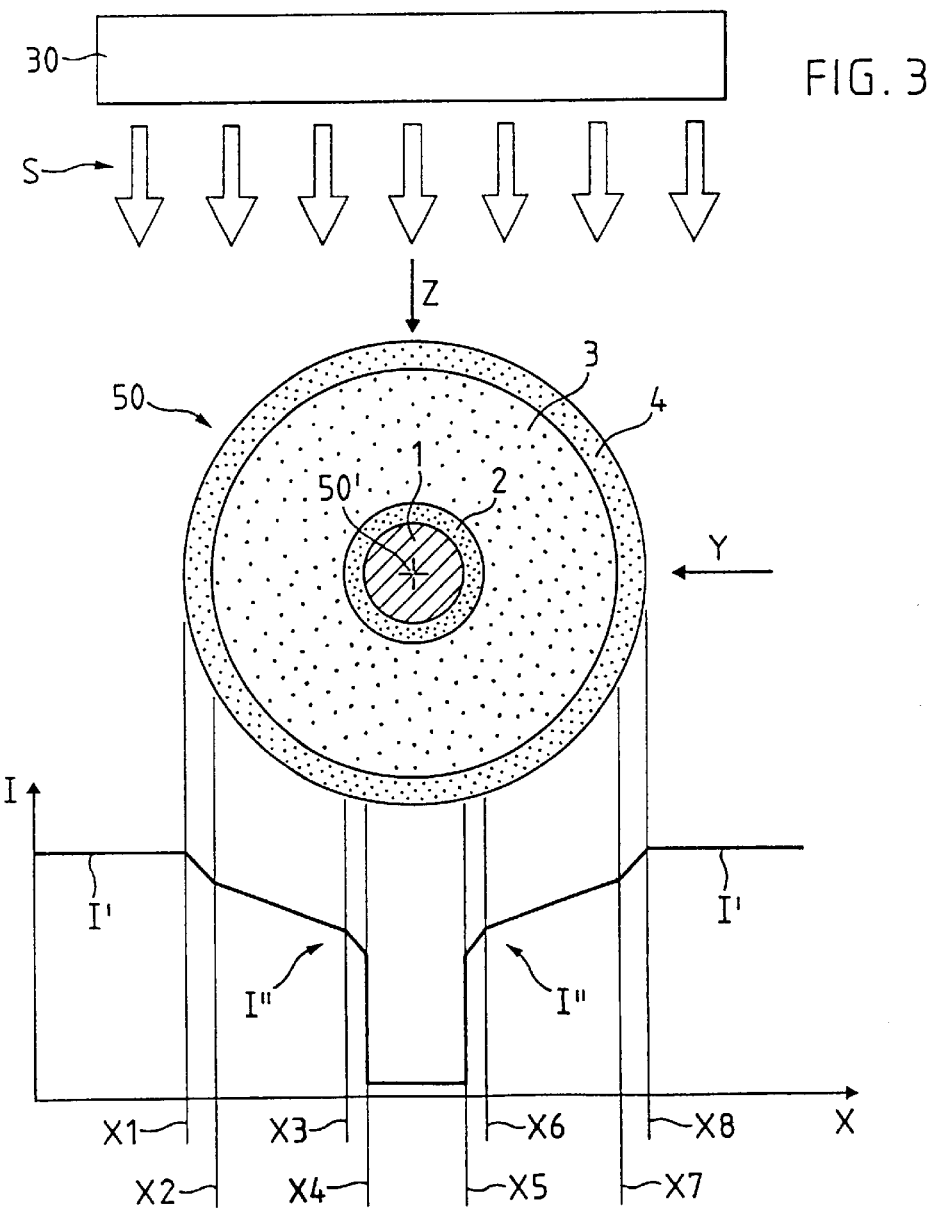
FIG. 3 shows an insulated conductor, represented on an enlarged scale and in profile cross-section, with graphic representation of correspondingly determined absorption values.

FIG. 3 shows, on an enlarged scale and in profile cross-section, the insulated conductor 50, essentially comprising the copper conductor 1, the inner semiconductor 2, the insulation 3 and the outer semiconductor 4, with the appropriately assigned, diagrammatically represented measuring device 30.

In the exemplary embodiment represented, a number of beams S, which are directed in the direction of arrow Z orthogonally to the insulated conductor axis 50' and correspondingly penetrate the individual semiconductor and insulating layers 2, 3 and 4 of the insulated conductor 50, are emitted by the measuring device 30, provided with a transmitting device (not shown) and a receiver device.

In the graphic representation, a beam intensity is denoted by the coordinate I and a measuring variable is denoted by X. The magnitude of the beam intensity (ahead of the insulated conductor 50) emitted by the transmitting device is denoted by I'.

The magnitude of the beam intensity (after the insulated conductor 50) reduced by the respective semiconductor and insulation layer and recorded by the receiver device is denoted by I".

On the coordinate X, the measuring variables correspondingly absorbed by the semiconductor and insulation layers 2, 3 and 4 as well as by the copper conductor 1 are specified by X1, X2, X3, X4, X5, X6, X7 and X8.

At this point it is pointed out that the radiation through the insulated conductor 50 orthogonally to the insulated conductor axis 50' in the circumferential direction of the insulated conductor 50 can be performed at any point, as represented in FIG. 3 by the direction of arrows Z and Y. Through-radiation may be performed with focused and with fanned beams, it being possible for measuring of the beams to take place at a point, on a line or else on a surface.

Passing radiation through by means of an appropriately designed X-ray detector system (X-ray device) is a preferred application, it likewise being possible for other beam systems and beam sources to be used.

We claim:

1. A method of measuring the entire cross section of an extruded elongated element which has multiple layers, as the element emerges from an adjustable extrusion device in which it is made, the method comprising the steps of:

penetrating the layers of the element, after the element has exited the extrusion device, by passing at least two differently directed, individual X-ray beams from at least two X-ray sources and which scan entirely across the element within a plane orthogonal to the axis of the element such that each X-ray source is simultaneously moved with its respective detector;

determining the X-ray intensity line-scan values of each beam;

computing the intensity values to determine the actual thickness of the individual layers; and should the computed intensity values indicate that the actual thicknesses of the individual layers are other than the desired thicknesses, adjusting the extrusion device in response to the computer intensity values to cause the extrusion device to produce the desired thickness.

2. A method according to claim 1, wherein the penetrating step further includes determining absorption values of the element, said absorption values being used for adjustment of the extrusion device.

3. A method according to claim 1, wherein the penetrating step further includes detecting undesired impurities or inhomogeneties of the layers.

* * * * *